(12) United States Patent
Windpassinger

(10) Patent No.: US 6,340,197 B1
(45) Date of Patent: Jan. 22, 2002

(54) INSULATION-LINED MOTOR-VEHICLE CONVERTIBLE TOP WITH INTEGRAL CONNECTING ELEMENTS

(75) Inventor: Martin Windpassinger, Hauzenberg (DE)

(73) Assignee: Parat Automotive Schonenbach GmbH + Co. KG, Remscheid (DE)

( * ) Notice: Subject to any disclaimer, the term of this patent is extended or adjusted under 35 U.S.C. 154(b) by 0 days.

(21) Appl. No.: 09/688,954

(22) Filed: Oct. 13, 2000

(30) Foreign Application Priority Data

Oct. 15, 1999 (DE) .......................... 199 49 878

(51) Int. Cl.$^7$ ................................. B60J 7/12
(52) U.S. Cl. .................. 296/107.11; 296/107.04; 296/107.06
(58) Field of Search .............. 296/107.01, 107.04, 296/107.06, 107.09, 107.11, 107.12, 107.15, 108, 116, 118, 214

(56) References Cited

U.S. PATENT DOCUMENTS

| | | | |
|---|---|---|---|
| 2,455,926 A | * 12/1948 | Gessler et al. | 296/211 |
| 2,823,951 A | * 2/1958 | Stahl | 296/214 |
| 2,879,105 A | * 3/1959 | Stahl | 296/214 |
| 3,276,814 A | * 10/1966 | Podolan | 135/88.09 |
| 3,642,317 A | * 2/1972 | Swindlehurst | 296/214 |
| 4,323,276 A | * 4/1982 | Hira et al. | 296/214 |
| 4,964,668 A | * 10/1990 | Hofmann | 296/107 |
| 5,297,838 A | * 3/1994 | Cziptschirsch | 296/214 |
| 5,511,844 A | * 4/1996 | Boardman | 296/107.11 |
| 6,000,749 A | * 12/1999 | Adam et al. | 296/214 |
| 6,082,807 A | 7/2000 | Hartmann et al. | 296/107.07 |

FOREIGN PATENT DOCUMENTS

| | | |
|---|---|---|
| DE | 6944515 | 4/1968 |
| DE | G 92 06 366 | 9/1992 |
| DE | G 92 09 122 | 12/1992 |
| DE | 4221570 A1 | 1/1994 |
| DE | 4441670 C1 | 11/1995 |
| DE | 19616891 C1 | 8/1997 |
| DE | 29718206 U1 | 4/1998 |

* cited by examiner

Primary Examiner—Joseph D. Pape
Assistant Examiner—Patricia L. Engle
(74) Attorney, Agent, or Firm—Herbert Dubno; Andrew Wilford

(57) ABSTRACT

A motor-vehicle convertible top has a foldable and waterproof cover having an inner face, a framework having a plurality of rigid struts juxtaposed with the inner face, a foam-plastic layer unitarily bonded to the inner face, connecting elements integral with the foam-plastic and secured to the struts so that the framework is connected via the elements to the cover. The connecting elements can be imbedded in the foam-plastic layer or unitarily formed with the foam-plastic layer. A roof liner is bonded to mounting strips, which are therin attatched to the struts.

22 Claims, 8 Drawing Sheets

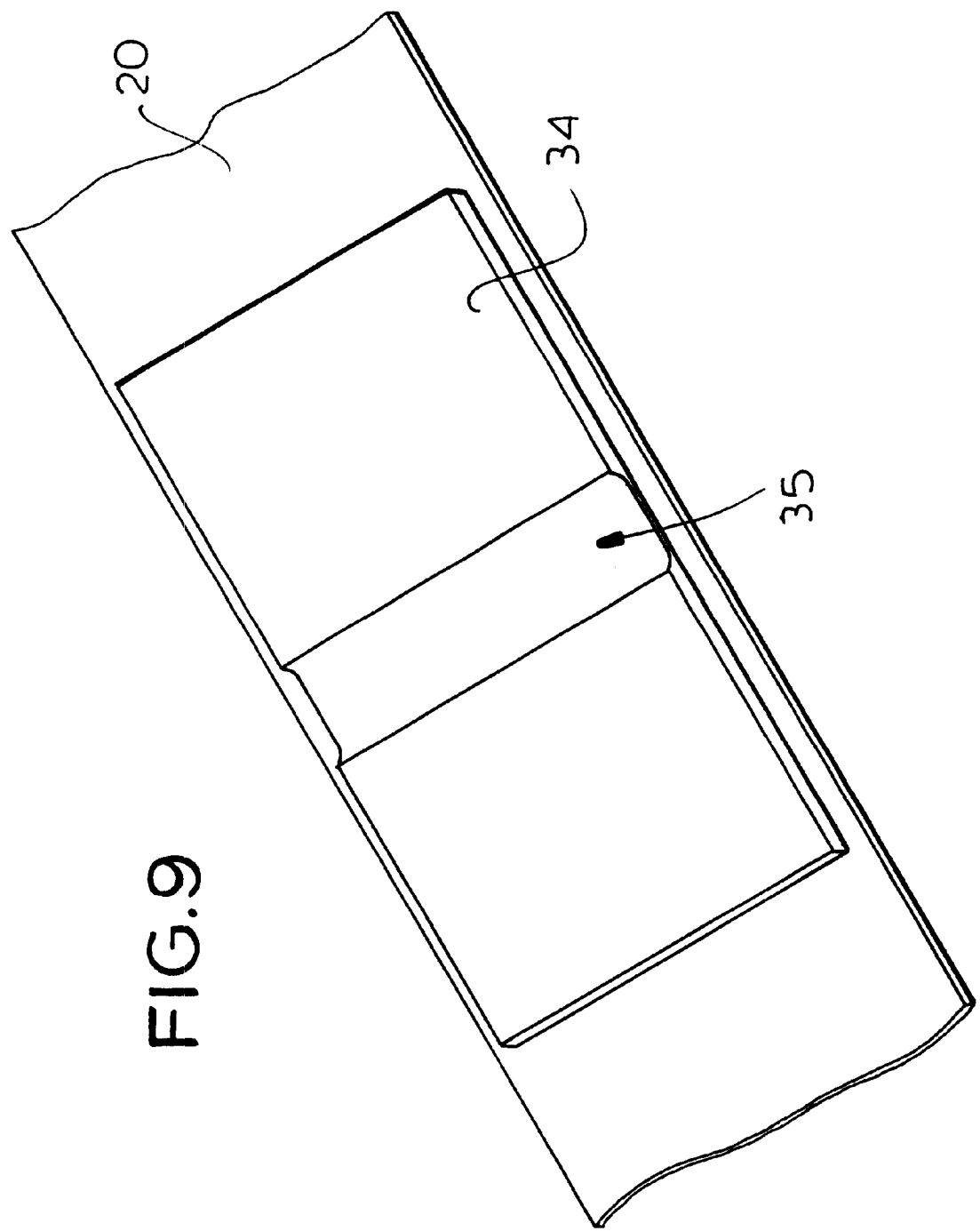

INSULATION-LINED MOTOR-VEHICLE CONVERTIBLE TOP WITH INTEGRAL CONNECTING ELEMENTS

FIELD OF THE INVENTION

The present invention relates to a convertible-type motor vehicle. More particularly this invention concerns a folding roof or top for such a vehicle.

BACKGROUND OF THE INVENTION

A standard motor-vehicle convertible top normally comprises a folding framework overlain by a flexible cover. The frame is comprised of a plurality of rigid struts or hoops. The cover normally comprises a waterproof outer layer, an intermediate sound- and heat-insulating layer, and an inner head liner layer. The framework typically is hidden between the inner and outer layers. It allows the top to move between a folded-down position normally recessed behind the passenger compartment and an up position stretched over the passenger compartment and connected to the upper edge of the windshield.

The top described in German patent 196 16 891 of H. Schanzer has generally tubular connecting clips that are stitched to a liner bonded to the outer layer. Thus the stitching securing these clips in place is not exposed externally so as to present a leak site. While this arrangement does very securely mount the cover on the framework, it is fairly complex.

German utility model 297 18 206 describes another top where mounting strips secure the support struts directly to the outer layer and the intermediate layer is pinched between the outer layer and the struts. The top structure is fairly complex, requiring many steps to secure the various parts together. In the finished top there is a thermal bridge between the outer layer and the struts formed by the mounting strips.

U.S. Pat. No. 6,082,807 of Hartmann describes an arrangement where a strip-shaped polyurethane casting is used to secure a windshield in a hole in the cover. This polyurethane strip can be extended around splice or stiffener elements also.

Further arrangements described in German utility models 69 445 15, 92 06 366, and 92 09 122 and in German patents 4,221,570 of W. Braun and 4,441,670- of M. Aydt are similarly complex. Their assembly is a complex operation and they often leave sites for water or heat to get through the top. The support struts are secured to the outer layer from which the intermediate insulating layer is suspended, or the latter is itself mounted on the struts.

OBJECTS OF THE INVENTION

It is therefore an object of the present invention to provide an improved motor-vehicle convertible top.

Another object is the provision of such an improved motor-vehicle convertible top which overcomes the above-given disadvantages, that is which is of simple construction but where the cover is solidly connected to the framework without the possibility of leakage.

SUMMARY OF THE INVENTION

A motor-vehicle convertible top has according to the invention a foldable and waterproof cover having an inner face, a framework having a plurality of rigid struts juxtaposed with the inner face, a foam-plastic layer unitarily bonded to the inner face, and connecting elements integral with the foam-plastic layer and secured to the struts so that the framework is connected via the elements to the cover.

The connecting elements can be imbedded in the foam-plastic layer or unitarily formed with the foam-plastic layer.

Thus with this system there is no stitching, adhesive, or welding needed to secure the connecting element to the cover. Instead it is anchored in the molded-on foam-plastic layer which can also serve as the heat- and sound-insulating intermediate layer of the cover. Thus the foam-plastic layer, which serves to secure the cover to the framework, serves double duty, and even stiffens the cover so that it will not deform and bulge outward during high-speed travel. In fact the foam-plastic layer can generally cover the entire inner surface of the cover and function as the sound- and heat-insulating intermediate layer.

The connecting elements in accordance with the invention are strips complementarily fittable with the struts. They may grip around the struts like clips or be simple formations that fit with and are screwed to the struts of the framework.

According to the invention the foam-plastic layer is polyurethane having a Shore D hardness of about 40 and is a two-component resin having a polyol:isocyanate ratio of about 100:38 by weight. It has a thickness of 2 mm to 8 mm.

The cover according to the invention has stitched seams and the foam-plastic layer covers and seals the seams. This completely solves the problem of how to waterproof the cover at these critical seams between the panels that make up the outer waterproof layer of the cover.

The cover in accordance with the invention includes reinforcing bands extending along ends of the struts. The foam-plastic layer extends over the bands. The foam-plastic layer also extends over a full length of each of the bands.

The cover includes a waterproof outer layer forming the inner surface and the foam-plastic layer can be formed as strips extending on the inner surface along the struts. These strips impart a soft curve to the cover where it passes over the strut for best appearance and aerodynamic properties. What is more, the foam-plastic layer that covers generally all of the inner surface can be interrupted at fold lines to facilitate folding of the cover in the closed position of the top.

BRIEF DESCRIPTION OF THE DRAWING

The above and other objects, features, and advantages will become more readily apparent from the following description, reference being made to the accompanying drawing in which:

FIG. 9 is a perspective view of a detail of the top in accordance with the invention.

SPECIFIC DESCRIPTION

Figure 1:
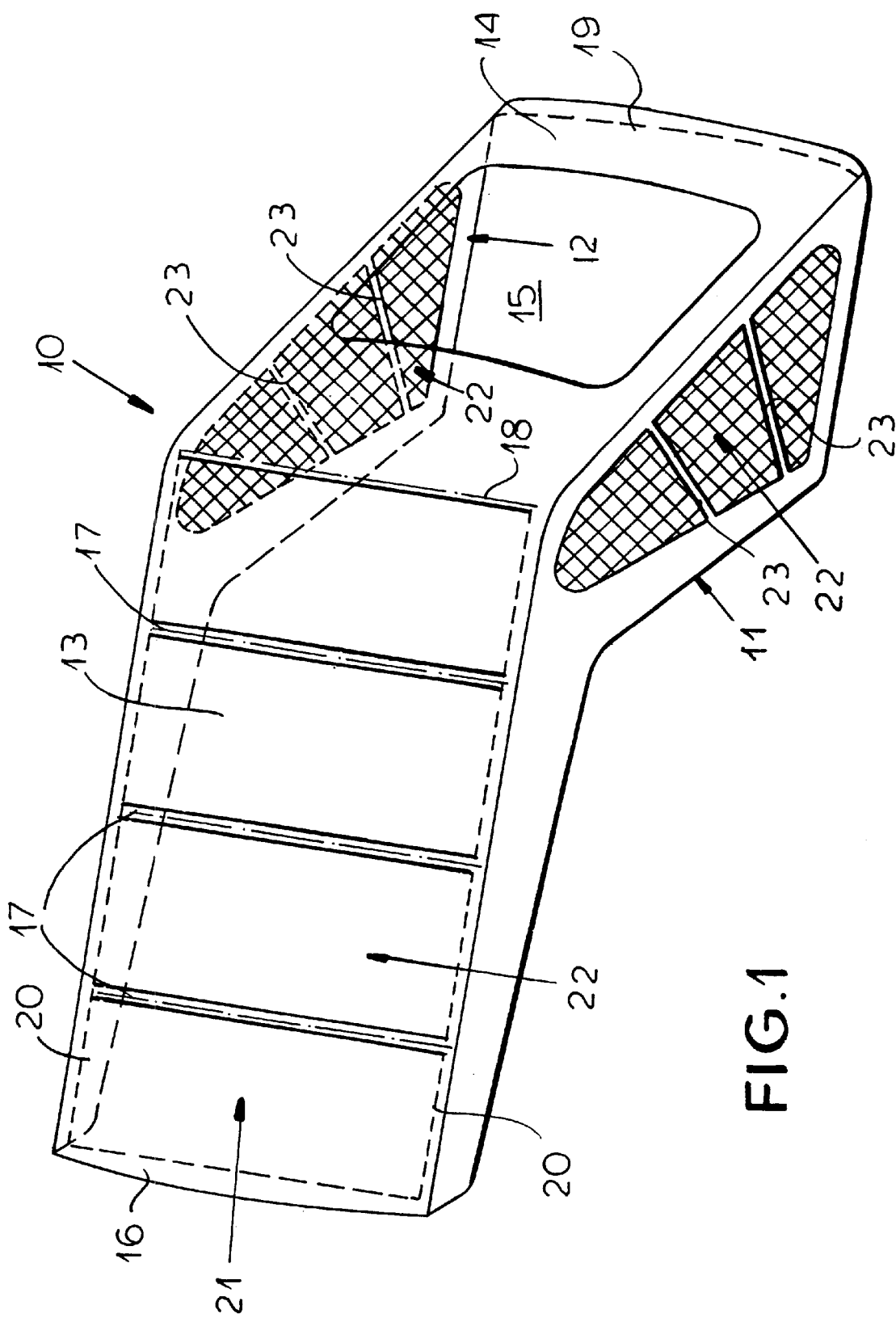
FIG. 1 is a partly diagrammatic small-scale perspective view of the convertible top according to the invention.

As seen in FIG. 1 a convertible top 10 according to the invention has a pair of closed sides 11 and 12, a roof 13, and a rear wall 14 provided with a window 15 secured in place as described in U.S. Pat. No. 6,082,807. A front bar 16 is secured by unillustrated clamps to the upper edge of an unillustrated windshield in an up or closed position. Metal transverse hoops or struts 17 extend between the sides 11 and 12 and one such strut 18 defines the rear of the roof 13 and top of the rear wall 14 while another such strut 19 defines the rear-wall lower edge. Reinforcing bands 20 extend along the corners where the sides 11 and 12 meet the roof 13 and rear wall 14.

According to the invention the top 10 is covered with an outer layer 21 comprised of an outer lamina of polyacrylate, an intermediate lamina of rubber, polyurethane, or a butyl, and an inner textile lamina or web of polyester or a mixture of cotton and polyester. In the drawing the three laminae are not shown separately as they are standard. This outer layer 21 needs to be impervious to water and gas. It is important according to the invention that its innermost face 21a (FIG. 4) be formed by a textile.

Figure 3:
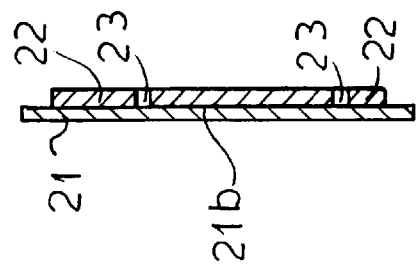
FIG. 3 is a section taken along line III—III of FIG. 2.
Figure 2:
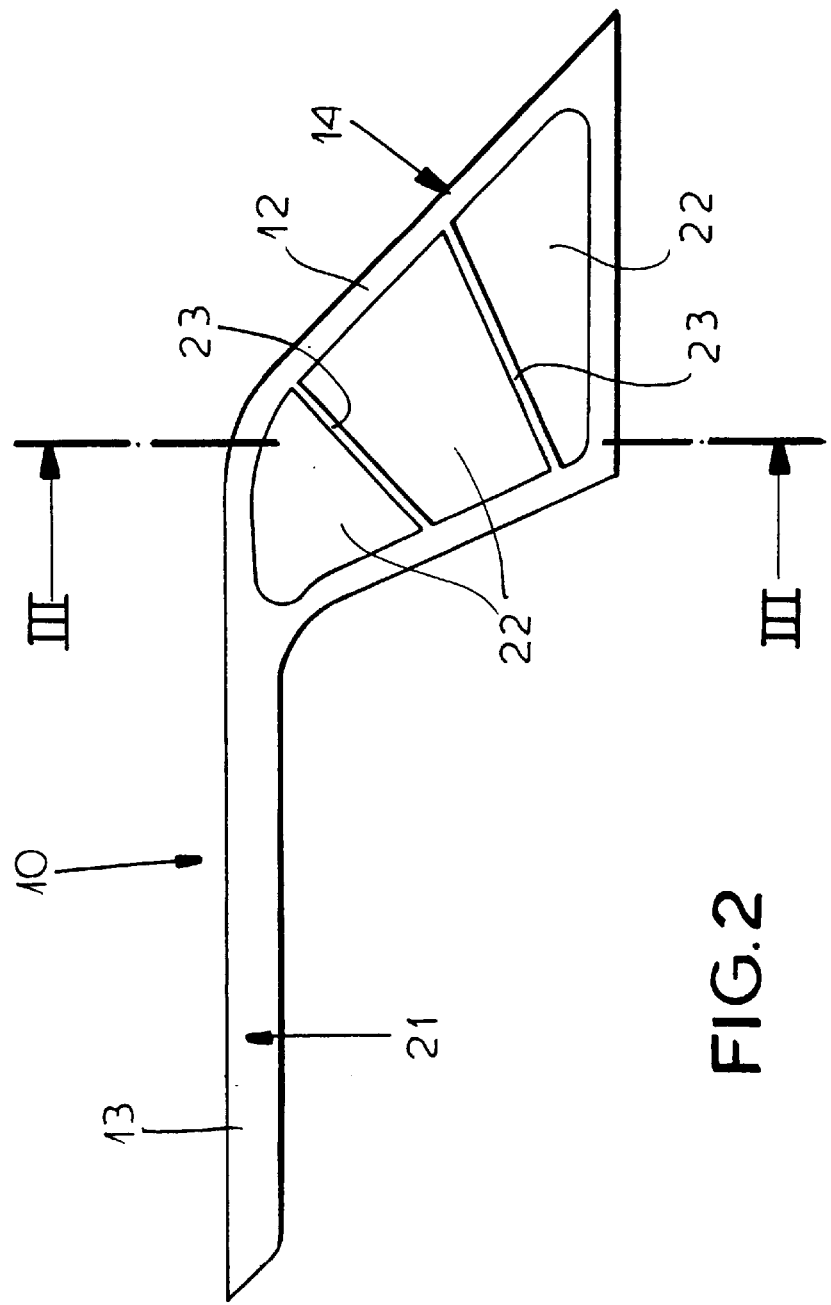
FIG. 2 is a side view of the top.

FIG. 1 shows how the roof part 13 and the sides 11 and 12 are provided with an inner insulating layer 22 shown by hatching and formed of a molded-in-situ closed-cell polyurethane. This insulating layer 22 extends over the entire inner surface of the outer layer 21 except as shown in FIGS. 2 and 3 at zones 23 in the side walls 11 and 12. The layer 22 covers seams 21b in the outer layer 21 and, since the material of the layer 22 is waterproof, it seals at these regions and eliminates any need for special treatment here. The zones 23 are intended to promote folding at these locations, as the top 10 must fold in a predetermined manner in order to fit in its compartment in the vehicle when down. The inner layer 22 is comprised of a two-component polyurethane that is applied in a mold at a high pressure of 140 bar to 150 bar to the inner face 21a so that it bonds directly and unitarily thereto. It has a thickness d of between 2 mm and 8 mm and a Shore D hardness of about 40.

Figure 4:
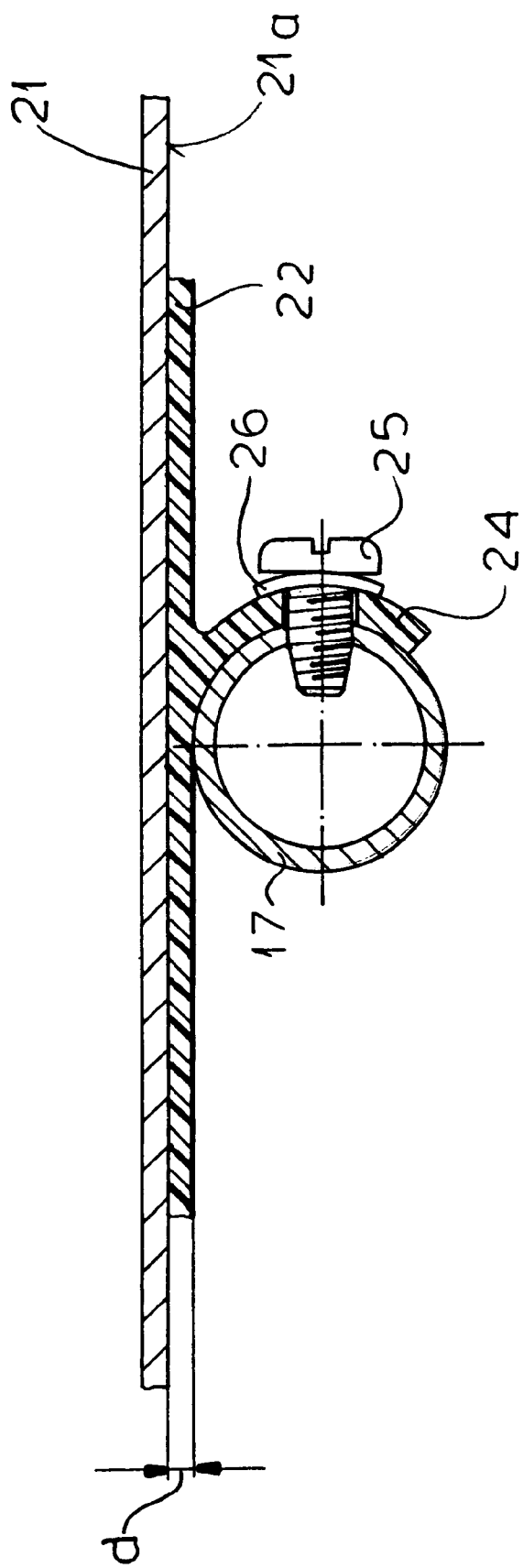
FIGS. 4 and 5 are sections through details of the top.
Figure 5:
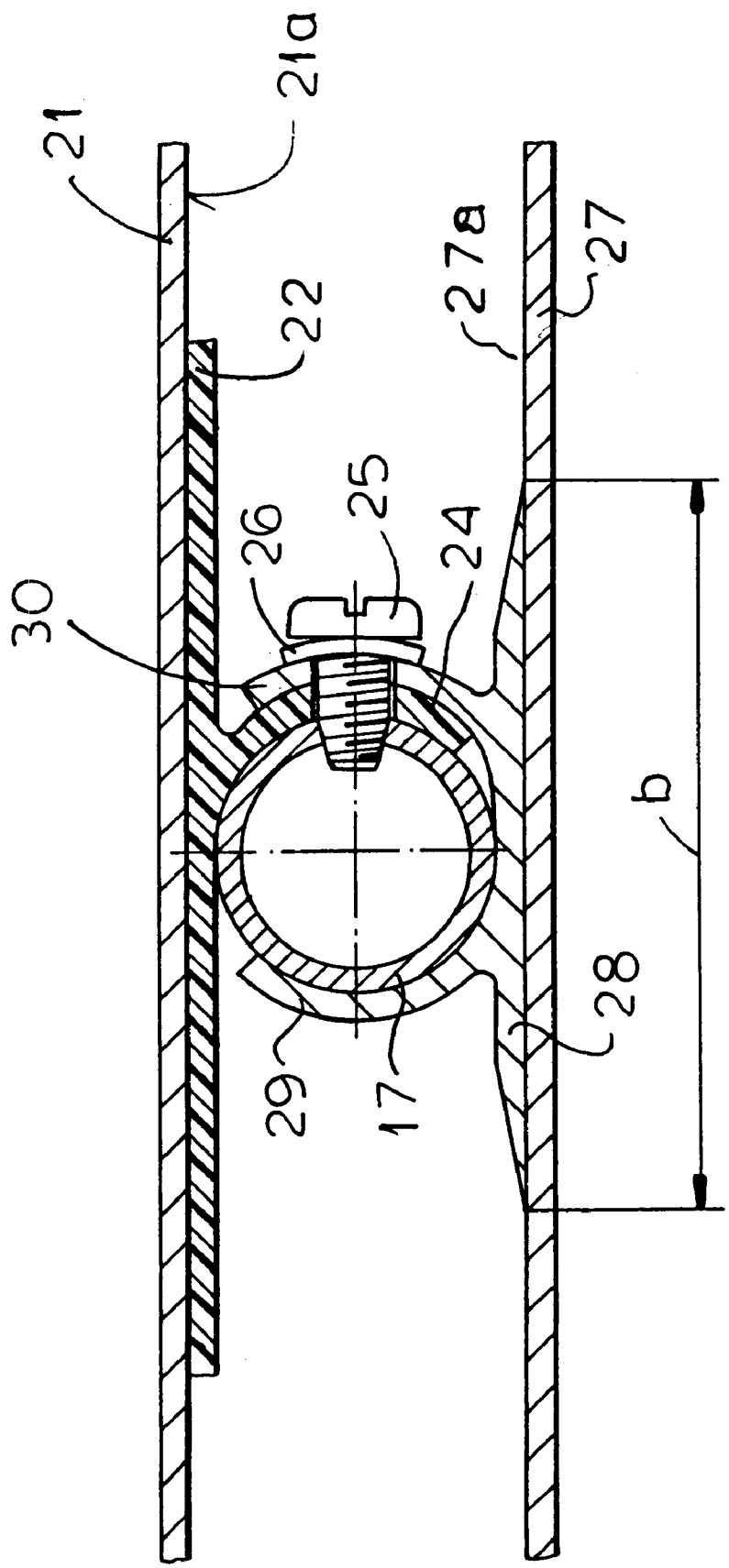

FIG. 4 shows one of the struts 17, here constituted as a metal tube. The insulating layer 22 here is unitarily molded with an inwardly extending flap 24 that wraps partly around the strut 17 and is secured thereto by screws 25 and washers 26. In FIG. 5 a textile roof liner 27 has an inner face 27a to which is bonded a molded plastic mounting strip 28 having a pair of inwardly directed ribs 29 and 30 that embrace the strut 17 and flap 24. The screws 25 also pass through the ribs 30 to secure the liner 27 in place. The strip 28 has a width b equal to about twice the diameter of the strut 17.

Figure 6:
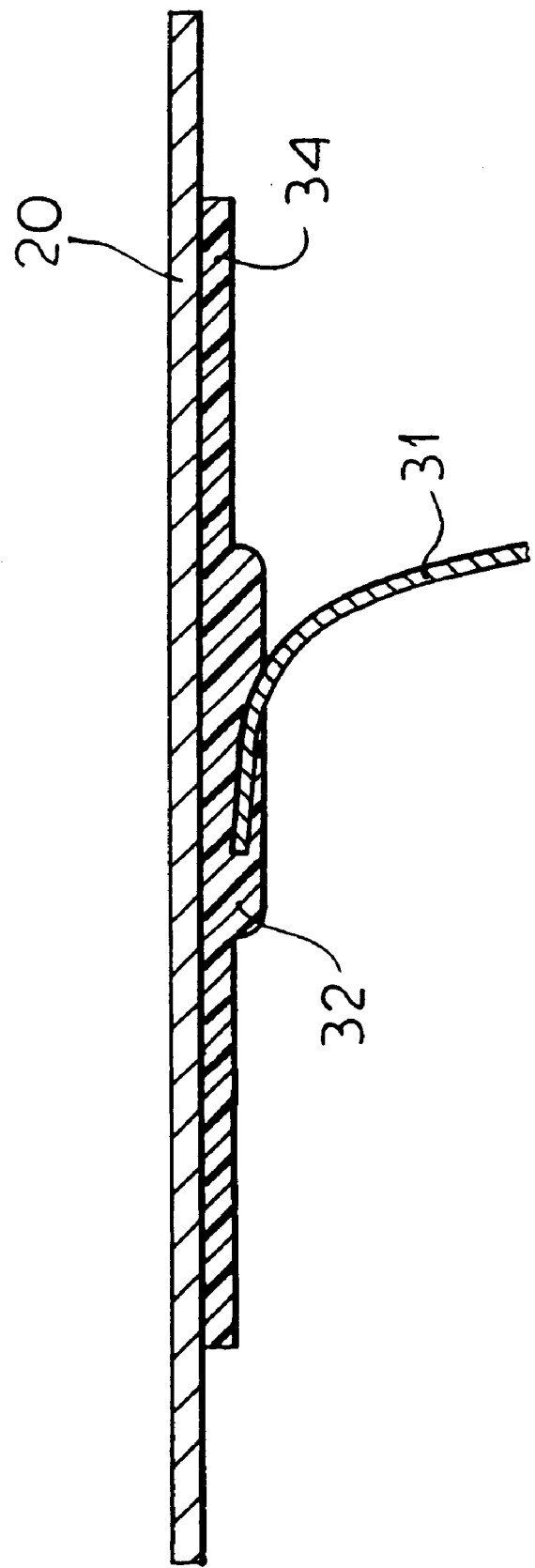
FIGS. 6 and 7 are sections through alternates to the detail of FIG. 4.
Figure 7:
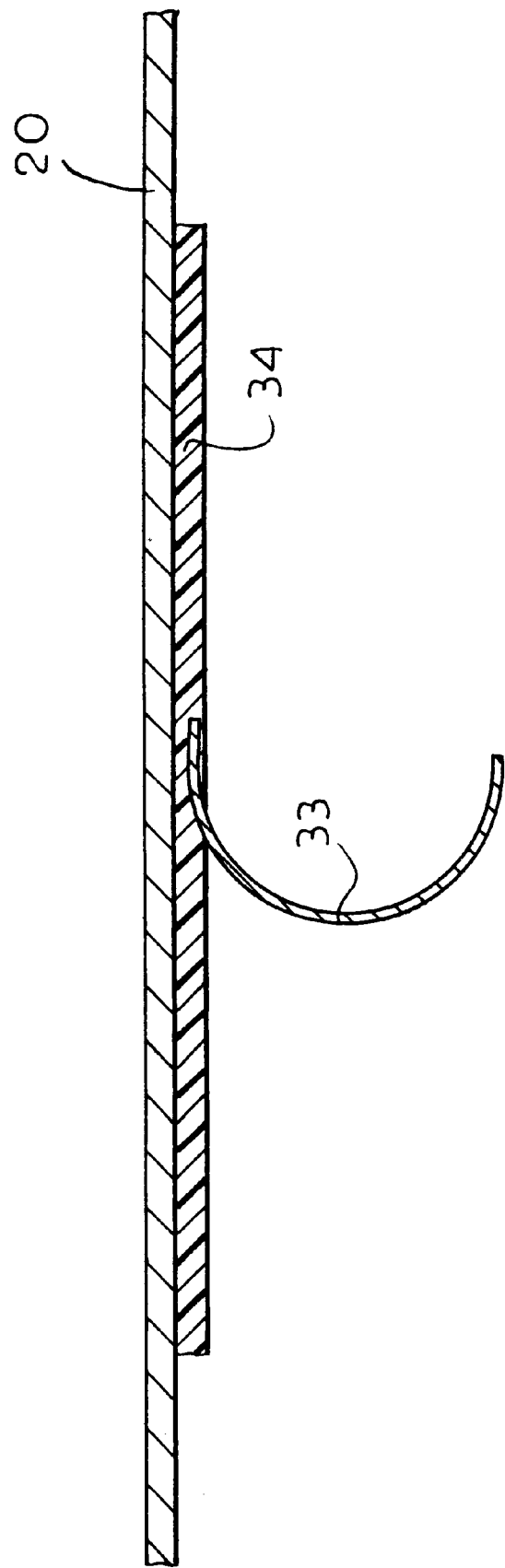

In FIG. 6 a connecting element, here a rubber band 31 is imbedded in a cast-plastic layer 34 having a thickened region 32 where the rubber band 31 is imbedded. In FIG. 7 there is no thickened region and a connecting element 33 of semicircular shape is used. These elements 31 and 33 are looped around and/or otherwise connected to the struts 17.

Figure 8:
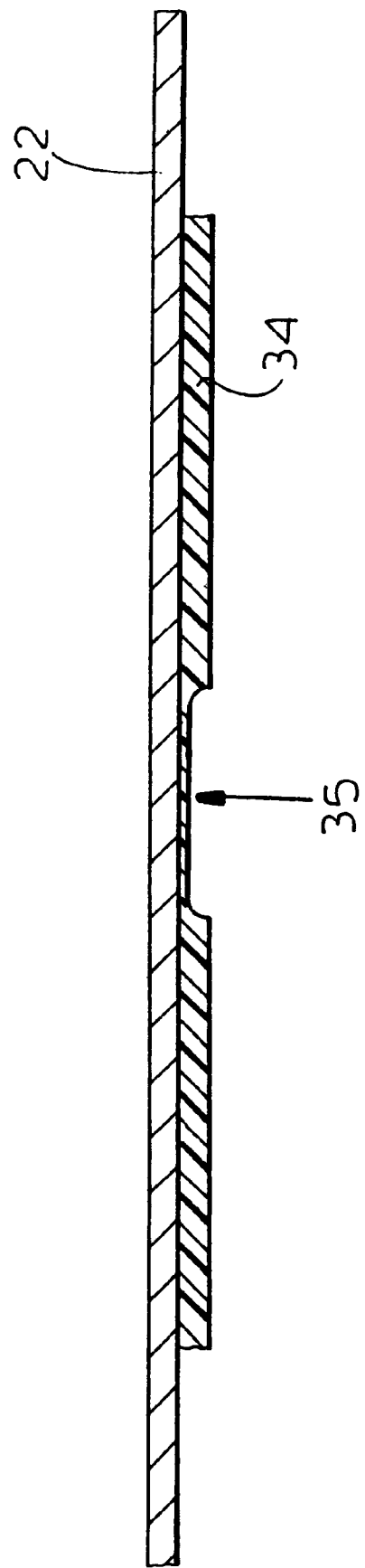
FIG. 8 is a section through another detail of the invention.

FIG. 8 illustrates a molded-plastic inner layer 34 with a thickness-reduced strip 35 that serves for bending at this region. It is applied to the outer layer 22 whereas in FIG. 9 the structure is applied to one of the reinforcing strips 20.

I claim:

1. A motor-vehicle convertible top comprising:
   a foldable and waterproof cover having an inner face;
   a framework having a plurality of rigid struts juxtaposed with the inner face;
   a foam-plastic layer unitarily bonded to the inner face;
   connecting elements integrally imbedded in the foam-plastic layer and secured to the struts, whereby the framework is connected via the elements to the cover.

2. The motor-vehicle convertible top defined in claim 1 wherein the connecting elements are strips complementarily fittable with the struts.

3. The motor-vehicle convertible top defined in claim 1 wherein the foam-plastic layer is polyurethane.

4. The motor-vehicle convertible top defined in claim 3 wherein the polyurethane has a Shore D hardness of about 40 and is a two-component resin having a polyol:isocyanate ratio of about 100:38.

5. The motor-vehicle convertible top defined in claim 3 wherein the foam-plastic layer has a thickness of 2 mm to 8 mm.

6. The motor-vehicle convertible top defined in claim 1 wherein the foam plastic layer generally covers the inner surface of the cover.

7. The motor-vehicle convertible top defined in claim 1 wherein the cover has stitched seams and the foam-plastic layer covers and seals the seams.

8. The motor-vehicle convertible top defined in claim 1 wherein the cover includes reinforcing bands extending along ends of the struts, the foam-plastic layer extending over the bands.

9. The motor-vehicle convertible top defined in claim 8 wherein the foam-plastic layer extends over a full length of each of the bands.

10. The motor-vehicle convertible top defined in claim 1 wherein the cover includes a waterproof outer layer forming the inner surface and the foam-plastic layer is formed as strips extending on the inner surface along the struts.

11. The motor-vehicle convertible top defined in claim 1 wherein the foam-plastic layer covers generally all of the inner surface and is interrupted at fold lines.

12. A motor-vehicle convertible top comprising:
    a foldable and waterproof cover having an inner face;
    a framework having a plurality of rigid struts juxtaposed with the inner face;
    a foam-plastic layer unitarily bonded to the inner face;
    connecting elements unitarily formed with the foam-plastic layer and secured to the struts, whereby the framework is connected via the elements to the cover.

13. The motor-vehicle convertible top defined in claim 12 wherein the connecting elements are strips complementarily fittable with the struts.

14. The motor-vehicle convertible top defined in claim 13 wherein the foam-plastic layer is polyurethane.

15. The motor-vehicle convertible top defined in claim 14 wherein the polyurethane has a Shore D hardness of about 40 and is a two-component resin having a polyol:isocyanate ratio of about 100:38.

16. The motor-vehicle convertible top defined in claim 14 wherein the foam-plastic layer has a thickness of 2 mm to 8 mm.

17. The motor-vehicle convertible top defined in claim 12 wherein the foam plastic layer generally covers the inner surface of the cover.

18. The motor-vehicle convertible top defined in claim 12 wherein the cover has stitched seams and the foam-plastic layer covers and seals the seams.

19. The motor-vehicle convertible top defined in claim 12 wherein the cover includes reinforcing bands extending along ends of the struts, the foam-plastic layer extending over the bands.

20. The motor-vehicle convertible top defined in claim 19 wherein the foam-plastic layer extends over a full length of each of the bands.

21. The motor-vehicle convertible top defined in claim 12 wherein the cover includes a waterproof outer layer forming the inner surface and the foam-plastic layer is formed as strips extending on the inner surface along the struts.

22. The motor-vehicle convertible top defined in claim 12 wherein the foam-plastic layer covers generally all of the inner surface and is interrupted at fold lines.

* * * * *